(12) United States Patent
Riesebosch

(10) Patent No.: US 12,443,808 B1
(45) Date of Patent: Oct. 14, 2025

(54) SYSTEMS AND METHODS OF ELECTRONIC DEVICE CONFIGURATION AND STORAGE OF OPERATIONAL DATA

(71) Applicant: Scott Riesebosch, Welland (CA)

(72) Inventor: Scott Riesebosch, Welland (CA)

( * ) Notice: Subject to any disclaimer, the term of this patent is extended or adjusted under 35 U.S.C. 154(b) by 0 days.

(21) Appl. No.: 18/919,853

(22) Filed: Oct. 18, 2024

(51) Int. Cl.
*G06K 7/10* (2006.01)

(52) U.S. Cl.
CPC .................. *G06K 7/10297* (2013.01)

(58) Field of Classification Search
CPC .................................. G06K 7/10297
USPC .......................................... 235/451
See application file for complete search history.

(56) References Cited

U.S. PATENT DOCUMENTS

| | | | |
|---|---|---|---|
| 7,825,776 B2 | 11/2010 | Smith et al. | |
| 9,548,797 B1 * | 1/2017 | Green | H05B 47/10 |
| 9,565,744 B2 | 2/2017 | Lai et al. | |
| 9,854,651 B2 | 12/2017 | Lai et al. | |
| 10,172,217 B2 | 1/2019 | De Menezes et al. | |
| 10,327,313 B2 * | 6/2019 | Choi | H05B 47/1965 |
| 10,624,168 B2 | 4/2020 | Bandel | |
| 12,328,778 B2 * | 6/2025 | Liu | G06K 7/10297 |
| 2008/0316002 A1 | 12/2008 | Brunet et al. | |
| 2015/0342011 A1 * | 11/2015 | Brochu | H05B 45/3577 315/294 |

FOREIGN PATENT DOCUMENTS

CA 3198521 A1 8/2018

* cited by examiner

*Primary Examiner* — Ahshik Kim
(74) *Attorney, Agent, or Firm* — Avek IP, LLC

(57) ABSTRACT

A near field communication (NFC) system and method capable of transmitting operation data to remote storage is disclosed herein. The system includes an electronic device with a removable central processing unit (CPU) containing an NFC reader. The CPU controls the operation of the electronic device and stores a data record containing operating parameters associated with the electronic device. A separately mounted NFC tag is located outside of the CPU of the electronic device in proximity to the NFC reader, such that a communication interface can be formed between the NFC tag and the NFC reader. The passive NFC tag has a rewritable storage element and is capable of storing the operating parameters that are transmitted from the NFC reader to the NFC tag during an interval of operation or after an event of operation.

25 Claims, 8 Drawing Sheets

SYSTEMS AND METHODS OF ELECTRONIC DEVICE CONFIGURATION AND STORAGE OF OPERATIONAL DATA

FIELD

This disclosure generally pertains to an electronic device with a near field communication (NFC) system and method for transmitting operation data to a storage element through the NFC system.

BACKGROUND OF THE INVENTION

In modern electronic devices, particularly LED lighting systems, the integration of sophisticated controls has become prevalent. LED devices typically employ electronic drivers which often incorporate advanced computer logic, expanding the functionality of LED devices beyond simple illumination. While these advancements have improved the versatility and efficiency of LED lighting systems, they have also introduced new challenges in maintenance and field servicing. A common issue is the premature failure of LED drivers, necessitating replacement of the LED driver currently in the field with a new LED driver. During the replacement process, the loss of programmed parameters and settings stored within the old driver's memory may be lost.

This issue extends beyond LED lighting to other electronic devices with programmable controls, including industrial equipment and smart devices (e.g. refrigerators, EV chargers, fans, robot vacuums, pool cleaning robots, heat pumps). When a technician replaces a faulty computer board with a new computer board, the device often loses the settings and programming from the old computer board. This scenario typically requires a separate visit from a specialized technician to reprogram the device, leading to increased downtime, additional costs, and other logistical burdens. The challenge of maintaining programmed settings during component replacement is a widespread concern across various electronic device sectors. This dilemma highlights the need for more efficient and cost-effective solutions to preserve device configuration parameters and history during maintenance procedures.

SUMMARY

In one aspect, a near field communication (NFC) system for transmitting operation data to remote storage is provided. The system comprises an electronic device with a housing and a central processing unit (CPU). The CPU is removably installed within the housing and contains an NFC reader. The CPU is configured to control an operation of the electronic device and to store a data record. The data record includes at least one operating parameter of the electronic device. The electronic device also contains a passive NFC tag comprising a rewritable storage element and an antenna. The passive NFC tag is mounted to the electronic device housing in a location separate from the CPU. The passive NFC tag is located within a proximity range of the NFC reader, wherein the NFC reader and passive NFC tag are operable to form a communication interface when positioned within the proximity range. The communication interface enables the NFC reader of the CPU to transmit at least a portion of the data record to the passive NFC tag for storage. The NFC tag is configured to receive at least a portion of the data record and store said data record within the rewritable storage element. The communication interface further enables the passive NFC tag to transmit at least a portion of the data record to the NFC reader. The CPU is configured to receive a portion of the data record from the NFC reader and control the operation of the electronic device in accordance with at least one operating parameter.

Also disclosed herein is a method of transmitting operation data to remote storage within an electronic device using a near field communication (NFC) system. The method comprises installing a CPU containing an NFC reader into a housing of the electronic device. A passive NFC tag is mounted to the electronic device housing in a location separate from the CPU. The NFC tag is located within a proximity range of the NFC reader, wherein the NFC reader and the passive NFC tag are operable to form a communication interface when positioned within the proximity range. The CPU is capable of controlling an operation of the electronic device and storing a data record. The data record stored in the CPU includes at least one operating parameter of the electronic device. The NFC reader transmits at least a portion of the data record through the communication interface to the passive NFC tag for storage. At some point, the data record stored upon the NFC tag may be transmitted to the NFC reader of the CPU. Upon receiving the data record with at least one operating parameter, the CPU may control the operation of the electronic device in accordance with the at least one operating parameter it received from the passive NFC tag.

The method can further comprise removing the CPU from the electronic device and installing a second CPU containing a second NFC reader into the electronic device. The passive NFC tag is within a proximity range of second installed NFC reader, and the second NFC reader and the passive NFC tag are operable to form a s second communication interface. Then at least a portion of the data record may be transmitted through the second communication interface from the passive NFC tag to the second NFC reader. The operation of the electronic device may then be controlled with the second CPU based upon the at least one operating parameter within the data record that was transmitted to the CPU.

Further disclosed herein is a method of configuring an electronic device using a near field communication (NFC) system. The method comprises installing a CPU containing an NFC reader into a housing of the electronic device A passive NFC tag is mounted to the electronic device housing in a location separate from the CPU. The NFC tag is located within a proximity range of the NFC reader, wherein the NFC reader and the passive NFC tag are operable to form a communication interface when positioned within the proximity range. The passive NFC tag contains a data record including at least one operating parameter of the electronic device stored upon a rewritable storage element. At least a portion of the data record is transmitted through the communication interface from the passive NFC tag to the NFC reader of the CPU. The operation of the electronic device is controlled with the CPU in accordance with the at least one operating parameter in the data record.

In another aspect, a near field communication (NFC) system for transmitting operation data to remote storage is disclosed. The system comprises an LED luminaire device including a housing and an LED driver. The LED driver containing an NFC reader is removably installed within the housing. The LED driver is configured to control an operation of an LED luminaire and to read and write a data record. The data record includes at least one operating parameter of the LED luminaire device. The system also includes a passive NFC tag comprising a rewritable storage element and an antenna. The passive NFC tag is mounted to the LED luminaire device housing in a location separate from the LED driver. The passive NFC tag is located within a proximity range of the NFC reader, wherein the NFC reader and passive NFC tag are operable to form a communication interface when positioned within the proximity range. The communication interface enables the NFC reader of the LED driver to transmit the data record to the passive NFC tag for storage. The NFC tag is configured to receive the data record and store said data record within the rewritable storage element. The communication interface further enables the passive NFC tag to transmit the data record to the NFC reader.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Often LED lighting products use an electronic driver (often referred to as an LED driver) that functions similarly to a fluorescent ballast. The driver converts alternating current (AC) to direct current (DC) and transmits the DC to the LEDs. Drivers may also have integrated computer logic to expand the functionality of the LED device. With computer logic, LED drivers can be programmed to adjust various output parameters. Some examples of output parameters include current levels, dimming curves, color temperatures, and color changing. They may also store and execute lighting schedules, allowing for automatic changes in lighting parameters throughout the day. Furthermore, LED drivers may incorporate device diagnostics and monitoring of the device performance.

It is not uncommon for an LED driver to fail prematurely and require replacement in the field. The LED driver may be mounted together with the luminaire in a housing, although it may also be mounted remotely. Commercial luminaires may be remotely located from the driver and may have quick disconnects for easily replacing the LED driver. Unfortunately, the problem with swapping out an LED driver in the field is that the programmed parameters and settings are lost because they are stored within the memory of the LED driver. When a new LED driver is placed within the device, the electrician doing the installation typically doesn't program the new device. Instead, a different contractor or technician is commissioned to program the device. This same pattern is often seen in other types of equipment such as industrial equipment and smart devices. For example, a service technician may determine that a new computer board is required and replaces it in the field, after which, all the device settings stored in memory of the old computer board are lost. This commonly occurring dilemma drives additional cost and complication into maintaining electronic devices with programmable controls.

The present disclosure addresses this problem by storing operating parameters on an NFC tag that is affixed to an electronic device in a location separate from the LED driver. When an LED driver is replaced, the operating parameters can be recovered from the NFC tag. This prevents the operating parameters from being lost, thereby eliminating the need for an operator to re-program the operating parameters after the installation of the new driver. In a primary embodiment of the present disclosure, the LED driver includes an NFC reader and may generally be referred to as a central processing unit (CPU). A person of ordinary skill in the art will understand that it is within the scope of the disclosure that other types of CPUs and electronic devices may include an NFC system for transmitting operation data to remote storage on an NFC tag mounted in a location that is separate, yet near the NFC reader incorporated into the CPU.

Figure 1A:
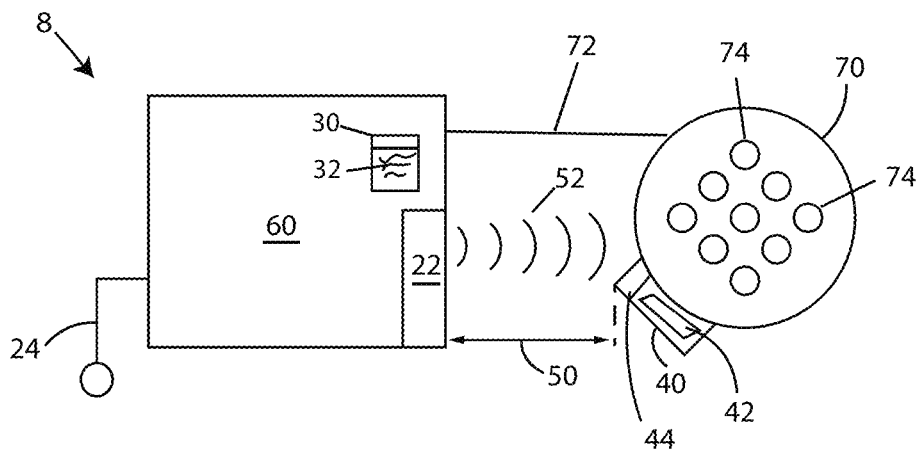
FIG. 1A is a schematic of an exemplary embodiment of an LED luminaire electronic device.

Turning now to FIG. 1A, an exemplary embodiment of an LED luminaire device 8 is shown schematically represented. The LED luminaire device 8 includes an LED driver 60 and an LED luminaire 70. Within the LED driver 60 is an NFC reader 22. The LED luminaire device is configured to receive power from an exterior source. An AC connection 24 accomplishes this by delivering alternating current (AC) to the LED driver 60. The LED driver 60 then converts the incoming AC to direct current (DC). The LED luminaire 70 may comprise one LED or multiple LEDs. The LED luminaire 70 may consist of, but is not limited to, single-color LEDs, tunable white LEDs, full-color RGB or RGBW LED arrays. The LEDs are generally represented in FIG. 1A by element 74. The LED driver 60 has an electrical connection 72 to supply power to the LED luminaire 70. In one implementation, the LED driver 60 includes a printed circuit board (PCB) that is populated with multiple electrical and electronic components (not shown) to provide power, facilitate operational control, and provide protection for the LED driver 60. For example, in one implementation, the LED driver 60 comprises a controller (not shown separately) and power regulation circuitry (not shown separately). The controller interprets the received command signals and adjusts its power output accordingly. In one embodiment, such as the one shown in FIG. 1A, the LED driver 60 may have an integrated NFC reader 22. In an alternative embodiment that is not shown in the figures, the LED driver 60 may be electrically connected to an external NFC reader.

The LED driver 60 is configured to be programmable and may have an integrated storage element (not shown separately) for storing a data record 30 with at least one operating parameter 32. Exemplary operating parameters 32 may include, but are not limited to, output current, output current dimming curve, output power, maximum current threshold, maximum power threshold, or number of hours of operation. The operating parameters may also include a serial number associated with the LED luminaire 70 or, in the event of an anomaly (e.g., power surge), an error message associated with anomaly. The LED driver 60 with the NFC reader may read and write a data record 30 containing at least one operating parameter 32. The LED driver 60 may store the operating parameters 32, which the NFC reader 22 can retrieve and transmit as a data record 30 to the NFC tag 40. This transmission may occur at predetermined intervals of operation 56, such as after a specific number of operating hours. Alternatively, the operating parameters 32 may be transmitted to the NFC tag 40 following an event of operation 58. Such events include user-initiated parameter changes via control inputs or the occurrence of operational anomalies that trigger error messages.

As shown in FIG. 1A, an NFC tag 40 is mounted outside and separate from the LED driver 60. The NFC tag 40 is mounted to the LED luminaire 70 in a location that is within a proximity range 50 of the NFC reader 22. The proximity range 50 may extend from very close coupling, such as less than 1 cm, up to an extended range of 20 cm. Specifically, the proximity range 50 may be less than or equal to 4 cm. For standard NFC coupling, the proximity range 50 may extend beyond 4 cm but remains less than or equal to 10 cm. It is to be understood that the specific proximity ranges disclosed herein are exemplary and that any suitable proximity range that enables effective NFC communication between the NFC tag 40 and the NFC reader 22 may be used.

The NFC reader 22 may incorporate a transceiver capable of bidirectional communication with NFC-enabled tags and devices. Operating at near 13.56 MHz, the NFC reader 22 utilizes inductive coupling to both retrieve data from and transmit data to compatible NFC tags 40. The inductive coupling provides power to the NFC tag 40 to write the data record 30 into the rewritable storage element 42. The communication interface 52 generally is the means in which the NFC tag 40 may receive power and communication from the NFC reader 22. More specifically, the NFC tag 40 may be a passive tag that doesn't require a wired electrical connection to store data into its memory. The NFC reader 22 allows for the extraction of stored information from the NFC tag 40, and the NFC reader's write capabilities enables the modification or the addition of data to the NFC tag 40.

The NFC tag 40 incorporates an antenna 44 and a rewritable storage element 42. The rewritable storage element 42 allows for multiple write and rewrite cycles, making it suitable for frequent updates. The rewritable storage element 42 can store a data record 30 containing the operating parameters 32 of the electronic device 10. The rewritable storage element 42 may incorporate security features such as password protection, encryption, access controls, and the like to prevent unauthorized reading or modification of the data. The antenna 44 may be constructed of high-conductivity materials, such as copper or aluminum, to facilitate effective coupling of the communication interface 52. The antenna 44 may be designed to be compact or embedded within the NFC tag 40, or it may be external to the tag.

Figure 1B:
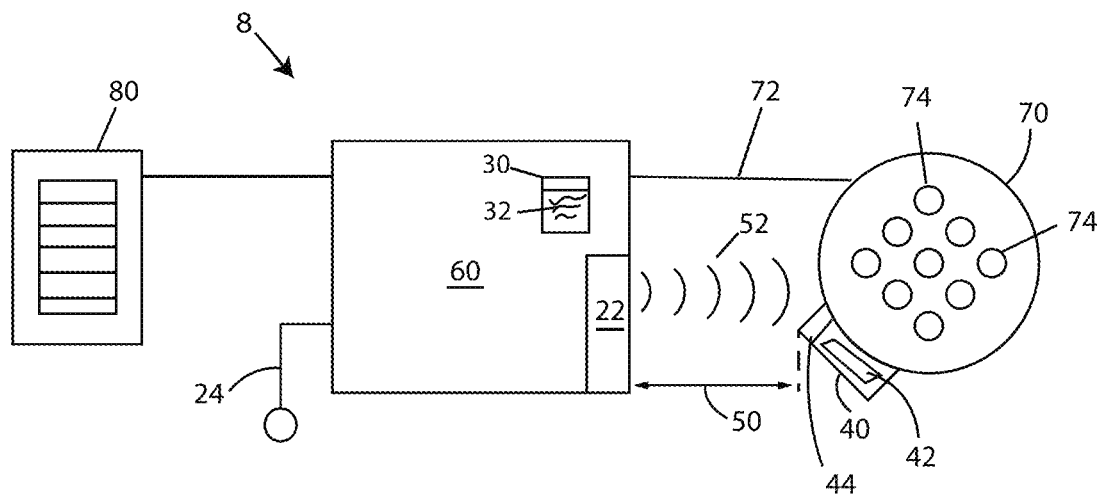
FIG. 1B is a schematic of an exemplary embodiment of an LED luminaire device with a wall control.

In an exemplary embodiment shown in FIG. 1B, the LED driver 60 may be controlled by an external wall control 80 that is electrically connected to the LED luminaire device 8. The wall control 80 is configured to transmit command signals to the programmable LED driver 60, which in turn modulates power delivery to the LED luminaire 70. The wall control unit incorporates a user interface that may include, but is not limited to, capacitive touch sensors, physical buttons, or a touchscreen display. This interface allows a user to input various lighting parameters such as brightness levels, color temperature adjustments, or pre-programmed light scenes. The wall control unit may be used to communicate operating parameters 32 to the LED driver 60 so that in turn, the LED driver 60 may communicate the operating parameters 32 to the NFC reader 22. The NFC reader 22 may then transmit the data record with the operating parameters 32 to the NFC tag 40.

Figure 1C:
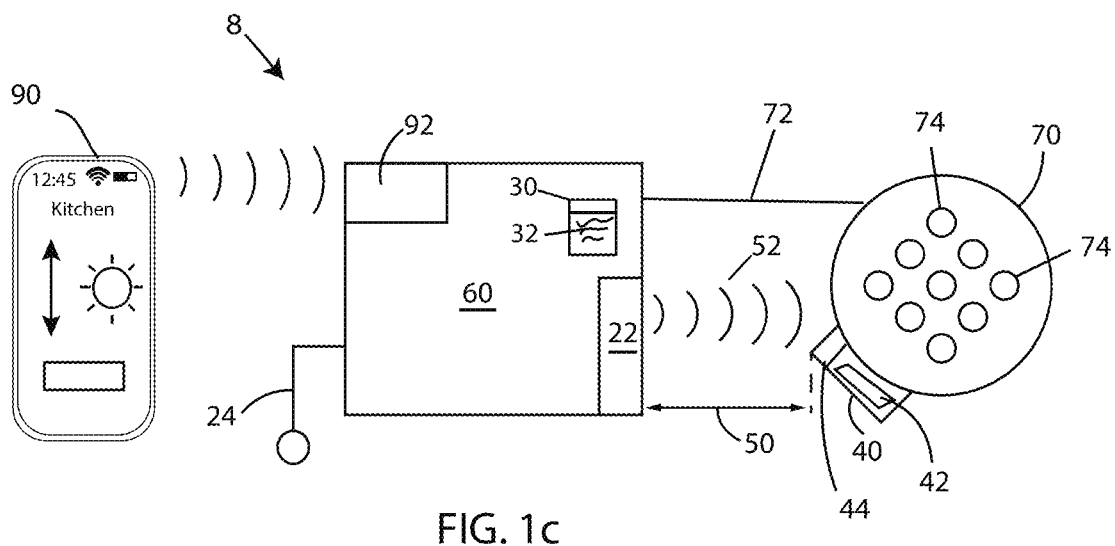
FIG. 1C is a schematic of an exemplary embodiment of an LED luminaire electronic device and corresponding application.

As shown in FIG. 1C, other types of controllers other than an external wall control may be employed to program the LED driver 60. For example, in an exemplary embodiment, the LED luminaire device 8 may be wirelessly connected to a mobile device 90 with a mobile application installed onto said mobile device to enable a user to program the LED driver 60. The mobile application, designed for compatibility with prevalent smartphone operating systems, establishes a communication link with the programmable LED driver 60. This connection may be facilitated through various wireless protocols, including but not limited to Wi-Fi, Bluetooth Low Energy, or NFC. The mobile application may have the capacity to store and recall user-defined operating parameters. The mobile application transmits control commands to the programmable LED driver 60 through the wireless receiver 92. The LED driver 60 interprets these signals and adjusts its output to the LED luminaire 70 accordingly. In yet other exemplary embodiments not shown in the Figures, the controller may be any type of computing device which programs the LED driver 60 using a website or installed software program. The control commands and operating parameters 32 may be transmitted to the NFC tag 40 at a specific interval of operation 56 or after an event in operation 58, such as the changing of a parameter or an anomaly or error message occurring during operation.

It should be understood that the descriptions recited regarding the elements of FIG. 1A can also be attributed to the commonly numbered features in each of FIGS. 1B and 1C.

Figure 2:
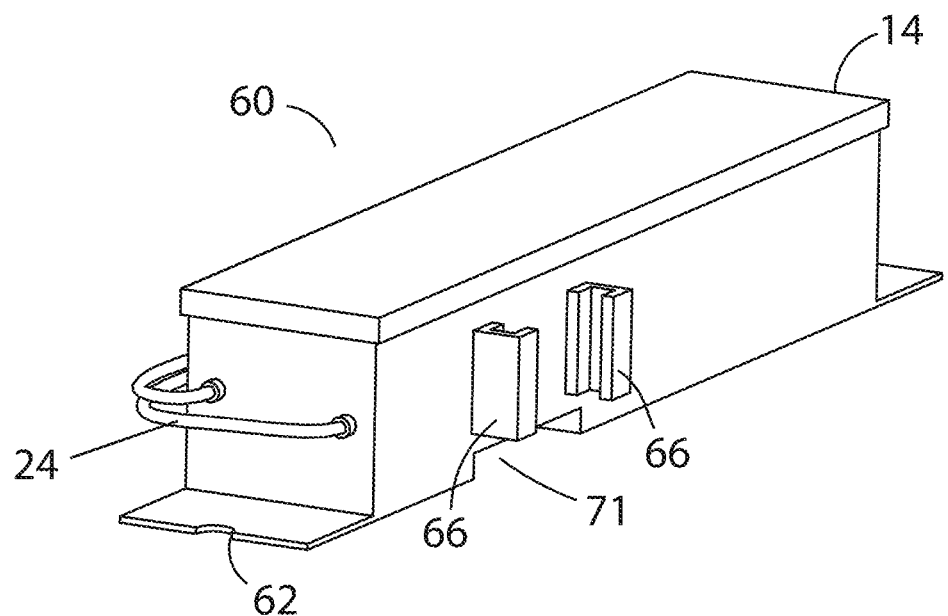
FIG. 2 is a perspective view of an exemplary embodiment of an LED driver with an alignment feature.
Figure 3:
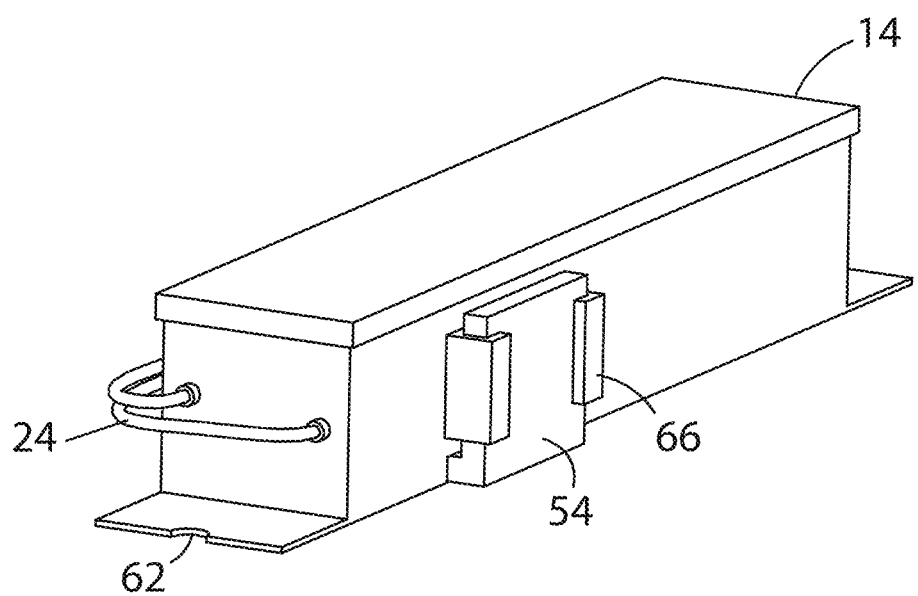
FIG. 3 is a perspective view of an exemplary embodiment of an LED driver and an installed NFC tag bracket.
Figure 4:
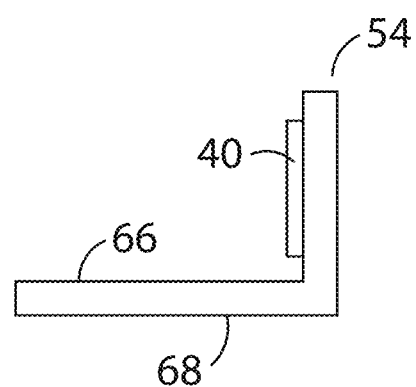
FIG. 4 is a side view of an exemplary NFC tag bracket.

FIGS. 2-4 show one exemplary embodiment of an NFC tag 40 and an LED driver 60. The mounted NFC tag 40 is shown in conjunction with an LED driver 60. The LED driver 60 incorporates an NFC reader 22. The LED driver 60 has a housing 14 with an attachment area 62 where the driver can be secured within the overall LED luminaire device 8. The NFC tag 40 is mounted to the LED luminaire 70 using an NFC tag bracket 54. As best seen in FIG. 4, in this implementation, the NFC tag bracket 54 is characterized by an "L" shaped profile. The NFC tag bracket 54 is designed to be externally attachable to LED driver 60. FIG. 2 shows the LED driver 60 without the NFC tag bracket 54 attached, and FIG. 3 shows the LED driver with the NFC tag bracket 54 attached. The NFC tag bracket 54 may be a plastic material chosen for its non-interference with NFC signals.

As shown in FIG. 4, the bracket has an upper surface 66 that mates to housing 14 of the LED driver 60 and a lower surface 68 that attaches to the LED luminaire 70. The lower surface 68 of the NFC tag bracket 54 may be joined to the LED luminaire 70 with an adhesive. Other methods of joining the NFC tag 40 to the LED luminaire 70 are within the scope of the disclosure. The NFC tag 40 may be either embedded within the NFC tag bracket 54 during the manufacturing process of the bracket, or it may be fixed or adhered to the surface of the bracket 54 post-production. The NFC tag 40 is designed to be affixed to the NFC tag bracket 54 in a manner that is substantially permanent. However, in the rare case of a failure of an NFC tag 40, it may be removed and replaced with a new NFC tag 40. The new NFC tag 40 could then receive the data record 30 from the NFC reader 22 of the LED driver 60 of the LED luminaire 8.

To promote communication between the NFC tag 40 and the NFC reader 22, the housing of the LED driver 60 incorporates an alignment feature 66. This feature is designed to position the NFC tag bracket 54 within the required proximity range 50 to form an NFC communication interface 52. The alignment feature 66 may take various forms such as a slot, sleeve, or any other type of retaining mechanism capable of receiving and positioning the NFC tag 40 and/or NFC tag bracket 54. In an implementation shown in FIGS. 2-4, the NFC tag bracket 54 fits into inwardly facing internal slots established into the alignment feature 66 on the housing 14 of LED driver 60, bringing the NFC tag 40 in proximity to the NFC reader 22 within LED driver 60. The upper surface 66 of the NFC tag bracket 54 fits within a recess 71 in the housing 14 of the LED driver 60 when the bracket is in alignment with the NFC reader 22. The passive NFC tag 40 may be, for example, a sticker tag, a card tag, or an industrial tag. The NFC tag 40 may be embedded into a fixture or component that is attached to the LED driver housing 14 (as illustrated in FIGS. 2-4). Alternatively, the NFC tag 40 may be attached directly to the LED driver housing 12 with an adhesive or other fasteners.

Figure 5:
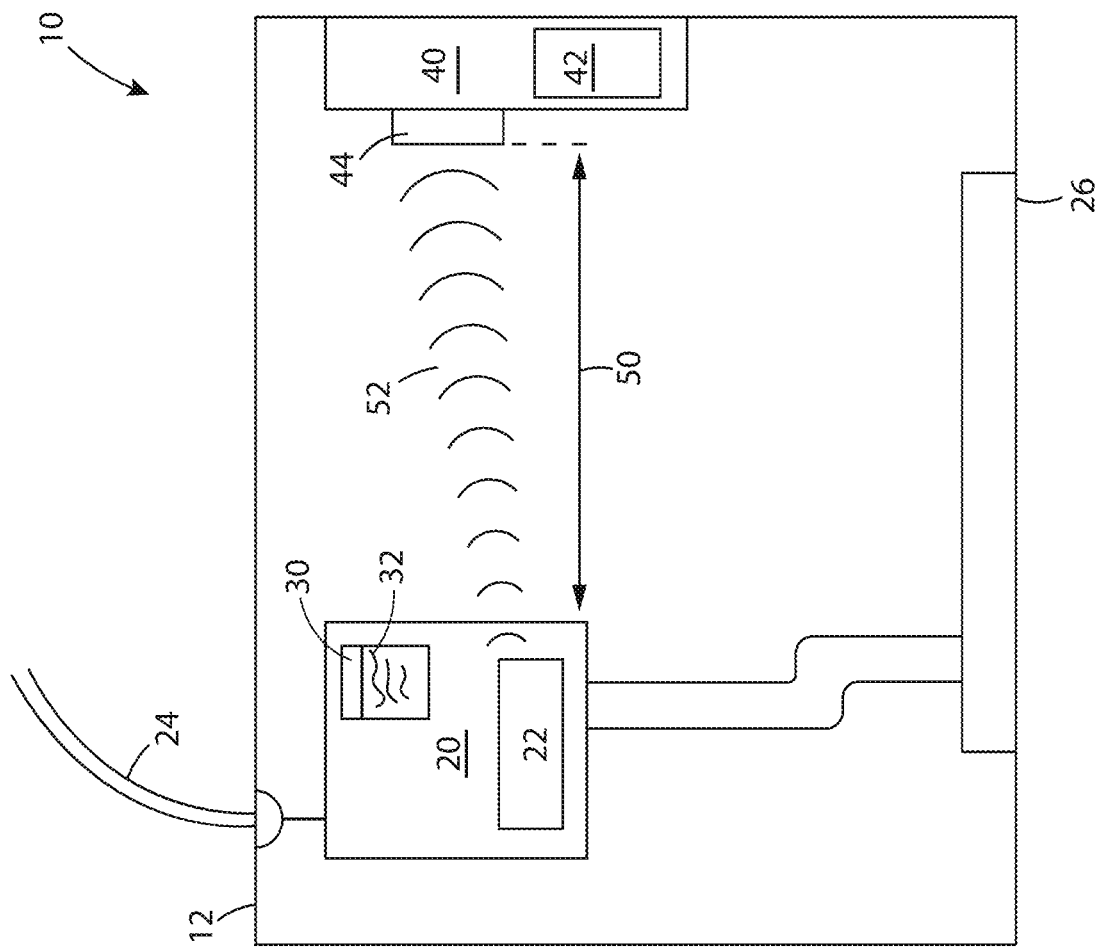
FIG. 5 is a schematic of an electronic device with the NFC system of the present disclosure.

It is to be understood that it is within the scope of the present disclosure for the LED luminaire device 8 to be an alternative electronic device (e.g., smart home appliances, computer hardware components, networking components, and industrial automation equipment). This is illustrated in FIG. 5, which is a schematic of an NFC system in accordance with present disclosure transmitting operation data to remote storage. An electronic device 10 includes a removable CPU 20 with an NFC reader 22. A passive NFC tag 40 is mounted to the device in a location separate from CPU 20. The electronic device 10 has a housing 12 surrounding the electronic components of the device. Within the housing 12 is the CPU 20, and within the CPU 20 is an NFC reader 22 having read/write capabilities to send and receive data records 30. The data record 30 may be stored temporarily within the CPU 20 and it may include at least one operating parameter 32 associated with the electronic device 10.

As previously discussed, the passive NFC tag 40 may be affixed to the housing 12 of the electronic device 10 or to a permanent fixture of the device. The NFC tag 40 includes an antenna 44 and a rewritable storage element 42. The NFC tag 40 is located within a proximity range 50 of the NFC reader 22, such that a communication interface may be formed between the two. The communication interface 52 facilitates the inductive coupling between the NFC reader 22 and the NFC tag 40. The CPU 20 and NFC reader 22 receive their power from a power source 24, while the NFC tag 40 receives power from the inductive coupling of the NFC reader 22. A data record 30 containing the operating parameters 32, or a portion thereof, may be transferred from the CPU 20 to the NFC tag 40 during an event of operation 58. The transferred data record 30 may comprise either all operating parameters 32 or a subset of parameters that have been modified or require updating. For example, the partial or complete data record 30 may be updated and transferred to the NFC tag 40 when the user makes a change to one of the operating parameters 32 through the user interface 26. The data records 30, whether complete or partial, may be regularly transmitted to the NFC tag 40 at certain intervals, for example, the data records 30 may be updated and transferred to the NFC tag 40 after every hour of operation.

The systems and methods disclosed herein, while primarily embodied in an LED luminaire device, are adaptable to a wide range of electronic devices. The scope of electronic devices encompassed by this disclosure includes, but is not limited to smart home appliances, computer hardware components, networking components, and industrial automation equipment. Furthermore, the CPU controlling the electronic device may take various forms, including: motherboards, human-machine interface controllers, computer numerical control units, programmable logic controllers, and servers.

Figure 6:
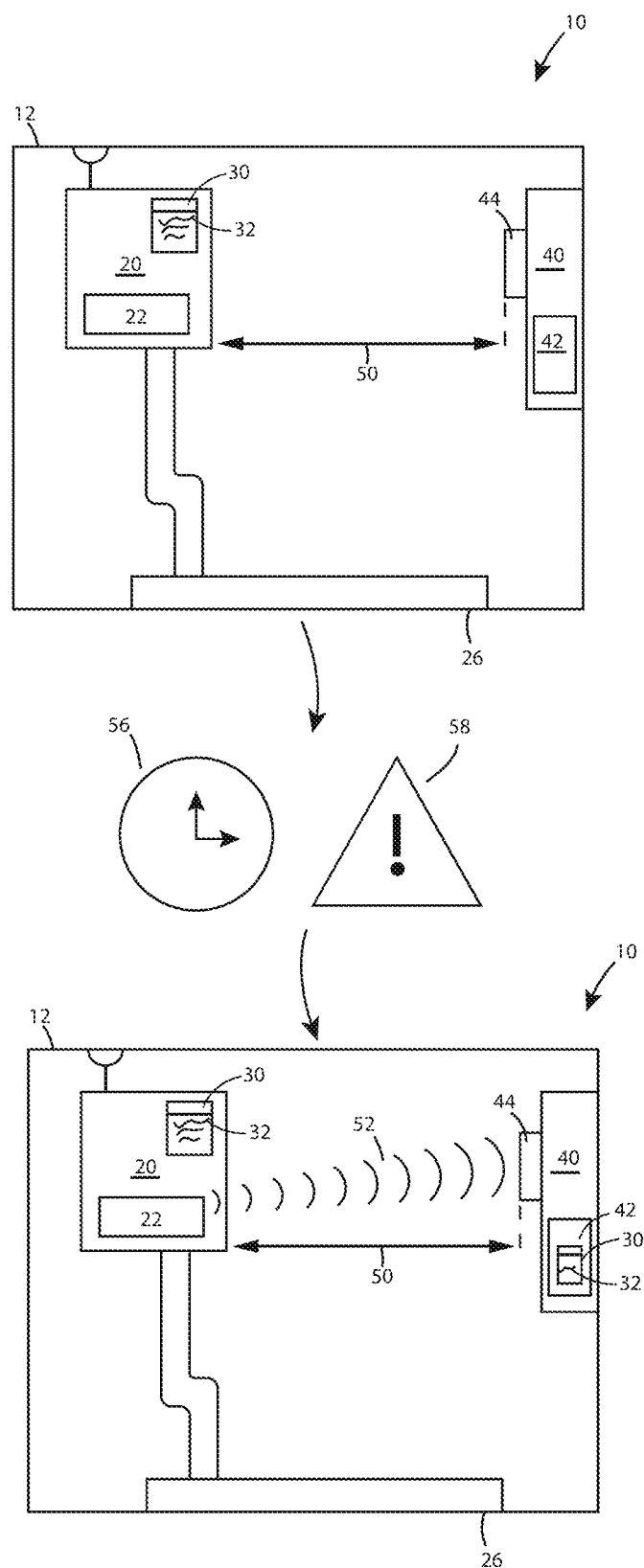
FIG. 6 is a schematic of the electronic device of FIG. 6 updating a data record after an event of operation or interval of operation.

As shown by a schematic in FIG. 6, at least a portion of a data record 30 may be transmitted to the NFC tag at an interval of operation 56 or during an event of operation 58. The system is designed to transmit the operating parameters 32 at predefined intervals of operation or in response to specific operational events. The system may be configured to transmit data records 30 to the NFC tag 40 at various intervals, such as hourly updates. Basic operational data like power consumption may be recorded every hour. A more comprehensive data set including cumulative operating hours, average temperature, and energy efficiency metrics could be transmitted daily. Long term trend data may also be recorded and transmitted to the NFC tag 40, such as information pertinent to long-term performance analysis, such as gradual changes in LED efficiency or power supply characteristics.

In addition to predetermined intervals, the system may log and transmit data records 30 with operational parameters 32 in response to specific operational events or anomalies, such as: overheating events, power surges, unexpected shutdowns, communication failures, moisture detection, and driver efficiency changes. The data record 30 transmitted to the NFC tag 40 may contain other general operating parameters 32 such as timestamp of the event or interval, nature of the event or type of interval update, relevant sensor readings, duration of anomalous conditions, and cumulative operating data. In an LED implementation of the present disclosure, the data record may contain an operating parameter 32 such as an output current to be supplied by the LED driver 60, an output current dimming curve to be supplied by the LED driver 60, an output power to be supplied by the LED driver 60, a maximum current threshold, a maximum power threshold, a serial number associated with the LED luminaire 70, an error message associated with the operation of the LED luminaire 70, or a number of hours of operation.

Figure 7:
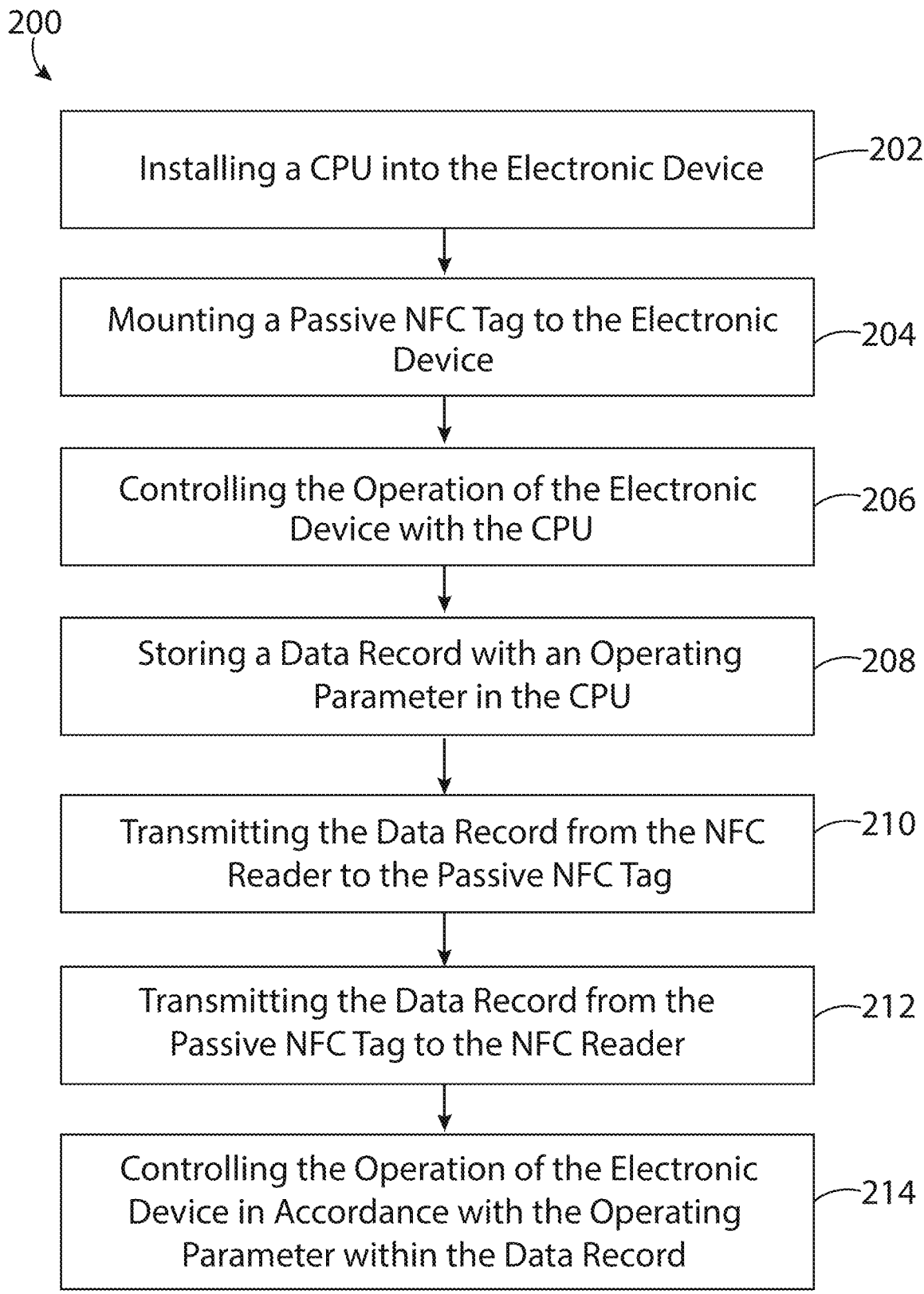
FIG. 7 is a flow diagram of an exemplary method of transmitting operation data to remote storage within an electronic device using an NFC system.

FIG. 7 shows a flow diagram of a method of transmitting operation data to remote storage within an electronic device using an NFC system according to an embodiment of the present disclosure. In flow diagram 200, at 202 the CPU is installed into the electronic device. It is possible this may happen during manufacturing, or it may happen at some later point after manufacturing, like in the case of a failure of the CPU. At 204, the passive NFC tag is mounted to the electronic device. At 206, the CPU controls the operation of the electronic device. During operation of the electronic device, a data record may be generated by the CPU that includes at least one operating parameter. At 208, the data record may be stored in the CPU in a storage element within the CPU, at least temporarily. At 210, the NFC reader of the CPU may transmit at least a portion of the data record from the NFC reader to the passive NFC tag, in turn, the data record may be saved upon the rewritable storage element of the passive NFC tag. At some point later at 212, the data record may be transmitted from the passive NFC tag to the NFC reader of the CPU. The transmission of the data record from the NFC tag to the NFC reader of the CPU can be initiated under various circumstances. In the event of a factory reset of the CPU, the NFC reader may retrieve the stored parameters from the NFC tag to restore the system to its previous configuration. Additionally, the data record may be transmitted to recover configuration parameters that were inadvertently modified or deleted during normal operation. The NFC system may implement user restrictions for NFC tag write operations, wherein parameter modifications and subsequent updates to the NFC tag are limited to authorized users with appropriate privileges. In instances where unauthorized users alter the electronic device settings, the original administrator approved configurations can be recovered and transmitted back to the CPU from the NFC tag. Optionally, at 214, the CPU may then control or program the electronic device in accordance with the operating parameters within the data record that the CPU has received from the NFC tag. Specifically, the CPU may utilize the transmitted operating parameters to perform self-reconfiguration or to adjust the operational characteristics of the electronic device. The NFC system ensures that critical operating parameters are safeguarded within the NFC tag, allowing for recovery of the parameters in various scenarios where CPU errors, failures, or unintended changes necessitate restoration of settings.

Figure 8:
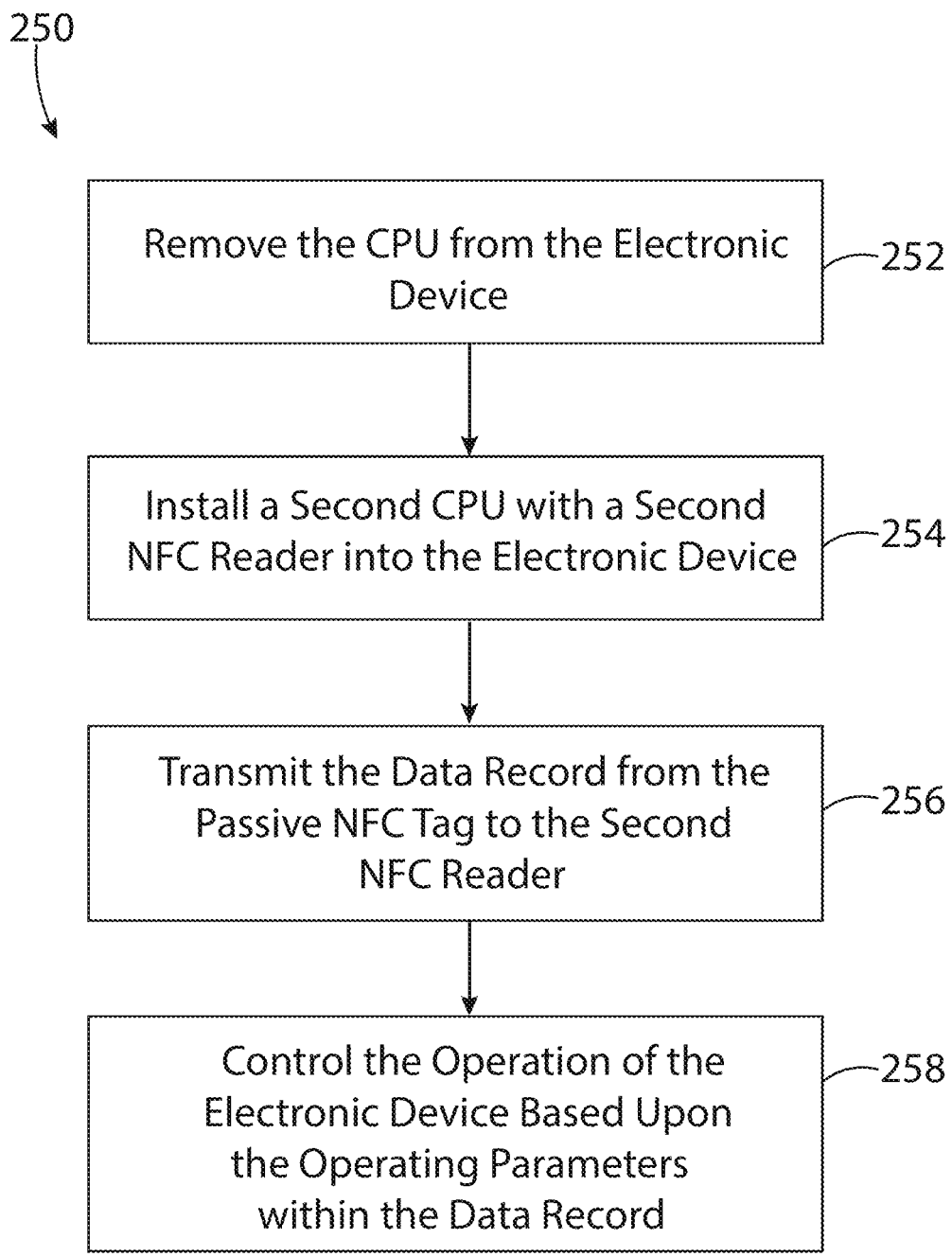
FIG. 8 is a flow diagram of a method of replacing a CPU and recovering the data record on the passive NFC tag with a new CPU.

FIG. 8 shows a flow diagram of a method of replacing a CPU with a different CPU and configuring the new CPU with the data record stored in the rewritable storage element of the NFC tag. In other words, a new CPU can be installed into the electronic device and the operating parameters that are stored upon the NFC tag can be recovered by the new CPU. In flow diagram 250, at step 252 the CPU is removed from the electronic device. At 254, a second CPU with a second NFC reader is installed to replace the first CPU. The second CPU is installed within the proximity range of the passive NFC tag. When power is supplied to the second CPU, the data record stored in the NFC tag is transmitted to the second NFC reader at 256. The CPU receives the data record containing the operating parameters and may update its controls based upon the operating parameters received at 258.

Figure 9:
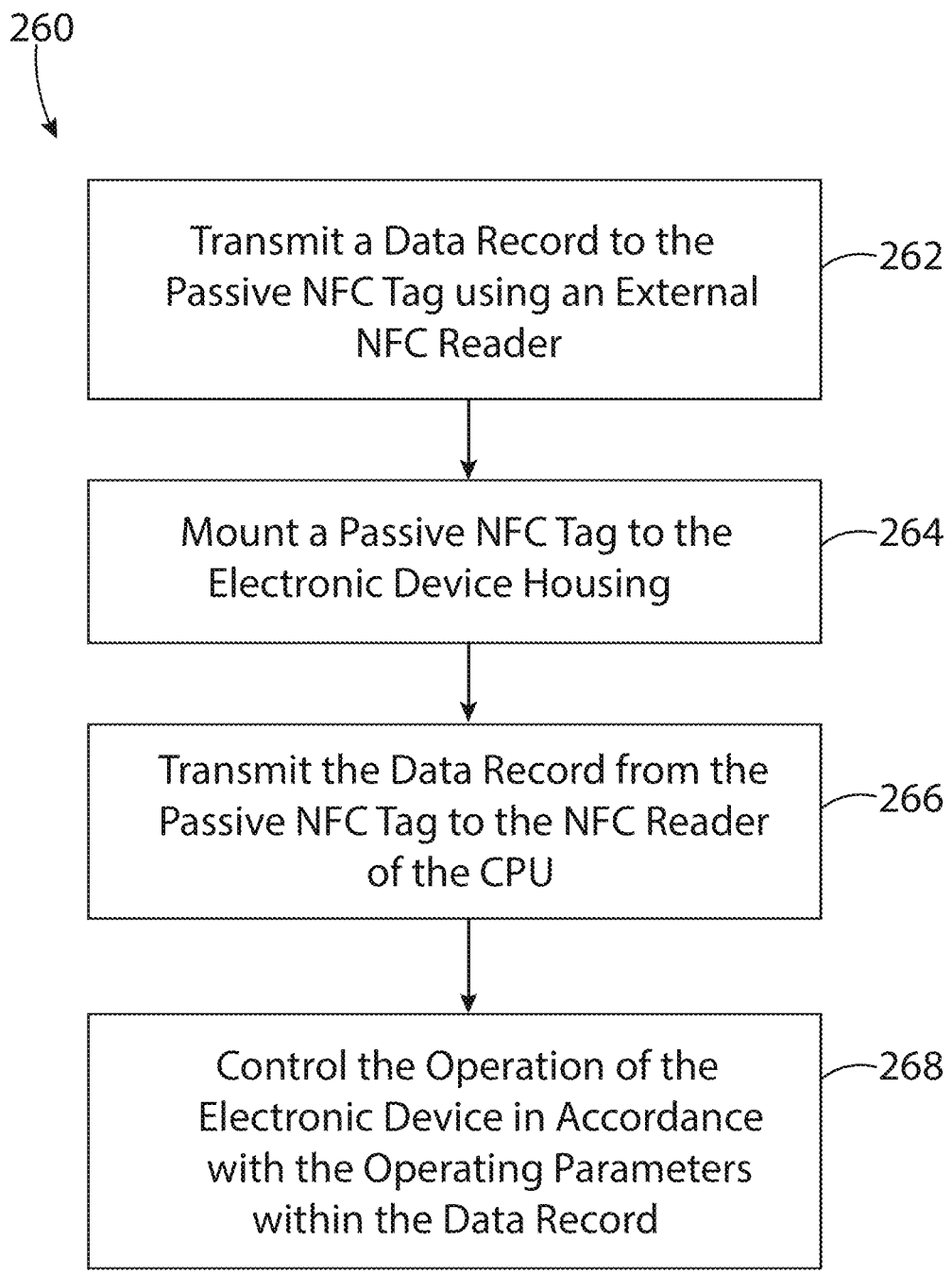
FIG. 9 is a flow diagram of an alternative method of transmitting operating parameters to the NFC tag using an external NFC reader.

In an alternative method shown in the flow diagram of FIG. 9, the NFC tag may be pre-programmed by an external NFC reader, wherein said external NFC reader operates independently of the electronic device's CPU. As shown in flow diagram 260, the NFC tag may be pre-programmed with a data record of configuration settings and operating parameters during manufacturing of the electronic device by the external NFC reader. At 262, the standalone, external NFC reader may write device-specific operating parameters and identification information onto the passive NFC tag. For example, the parameters and information may be based on variables such as target country destination, model-specific features, and regulatory requirements. Subsequently at 264, the NFC tag may be mounted to the housing or some other permanent fixture of the electronic device. Then upon powering up the CPU of the electronic device, the data record may be transmitted from the NFC tag to the NFC reader within the CPU of the electronic device at 266. The data record may be used to perform the initial configuration of the electronic device. Ultimately at 268, the electronic device may be controlled based upon the operating parameters that were transferred to the CPU. During subsequent operation of the electronic device, the NFC tag may be over-written with new updates to the data record with the NFC reader contained within the CPU of the electronic device. It should be understood by one skilled in the art that the steps may be performed in a different order. For example, the NFC tag may first be mounted to the electronic device during manufacturing. Then the external NFC reader may write operating parameters onto the NFC tag to be used for the configuration of the device after manufacturing.

The following description includes numerous specific details. However, it should be understood that implementations of the invention may be realized without adhering to all of these specifics. In certain instances, well-known circuits, structures, and techniques have been omitted from detailed description to avoid obscuring the essence of this disclosure.

References to "one embodiment," "an embodiment," "exemplary embodiment," or similar phrases indicate that the described embodiment(s) may incorporate certain features, structures, or characteristics. It is important to note that not every embodiment necessarily includes all of the particular features, structures, or characteristics described. Furthermore, some embodiments may incorporate some, all, or none of the features detailed for other embodiments.

In the context of the claims, the use of ordinal adjectives such as "first," "second," "third," and so forth to describe a common object serves merely to distinguish between different instances of similar elements. These adjectives are not intended to imply that the elements must adhere to a specific sequence, whether temporal, spatial, in ranking, or in any other manner, unless explicitly stated otherwise.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A near field communication (NFC) system for transmitting operation data to remote storage, the system comprising:

an electronic device comprising a housing and a central processing unit, the central processing unit removably installed within the housing, the central processing unit containing an NFC reader, the central processing unit configured to control an operation of the electronic device and to store a data record, the data record including at least one operating parameter of the electronic device;

a passive NFC tag comprising a rewritable storage element and an antenna, the passive NFC tag being mounted to the electronic device housing in a location separate from the central processing unit, said passive NFC tag being located within a proximity range of the NFC reader, wherein the NFC reader and passive NFC tag are operable to form a communication interface when positioned within the proximity range;

wherein the communication interface enables the NFC reader of the central processing unit to transmit at least a portion of the data record to the passive NFC tag for storage, the NFC tag being configured to receive at least a portion of the data record and store said data record within the rewritable storage element; and wherein the communication interface further enables the passive NFC tag to transmit at least a portion of the data record to the NFC reader.

2. The system of claim 1, wherein the central processing unit is configured to receive at least a portion of the data record from the NFC reader and control the operation of the electronic device in accordance with the at least one operating parameter.

3. The system of claim 1, wherein the communication interface enables the NFC reader of the central processing unit to transmit the data record to the passive NFC tag for storage at an interval of operation or an event of operation.

4. The system of claim 1, wherein the passive NFC tag is attached to an NFC tag bracket, the NFC tag bracket being mounted on the electronic device.

5. The system of claim 4, wherein the central processing unit further comprises a housing, the central processing unit housing having at least one alignment feature to aid in aligning the NFC tag bracket within the proximity range to the NFC reader of the central processing unit.

6. The system of claim 4, wherein the NFC tag bracket is a plastic bracket, wherein the passive NFC tag is embedded within the plastic of the NFC tag bracket.

7. The system of claim 1, wherein the passive NFC tag is mounted within a proximity range less than four centimeters from the NFC reader of the central processing unit.

8. The system of claim 1, wherein the electronic device is an electronic device selected from a list consisting of:
an LED luminaire device;
a smart home appliance;
a computer hardware component;
a networking component; and
an industrial automation equipment component.

9. The system of claim 8, wherein the central processing unit is a central processing unit selected from a list consisting of:
an LED driver;
a motherboard;
a human-machine interface controller (HMI);
a computer numerical control unit (CNC);
a programmable logic controller (PLC); and
a server.

10. The system of claim 9, wherein the central processing unit is an LED driver and the electronic device is an LED luminaire device.

11. The system of claim 10, wherein the passive NFC tag is mounted to the LED luminaire device.

12. The system of claim 10, wherein the data record stored on the passive NFC tag includes at least one operating parameter selected from a list consisting of:
an output current to be supplied by the LED driver;
an output current dimming curve to be supplied by the LED driver;
an output power to be supplied by the LED driver;
a maximum current threshold;
a maximum power threshold;
a serial number associated with the LED luminaire;
an error message associated with the operation of the LED luminaire; and
a number of hours of operation.

13. A method of transmitting operation data to remote storage within an electronic device using a near field communication (NFC) system, the method comprising:
installing a central processing unit into a housing of the electronic device, the central processing unit containing an NFC reader;
mounting a passive NFC tag to the electronic device housing in a location separate from the central processing unit, the NFC tag being located within a proximity range of the NFC reader, wherein the NFC reader and the passive NFC tag are operable to form a communication interface when positioned within the proximity range;
controlling an operation of the electronic device with the central processing unit;
storing a data record in the central processing unit, the data record including at least one operating parameter of the electronic device;
transmitting at least a portion of the data record through the communication interface from the NFC reader of the central processing unit to the passive NFC tag for storage; and
transmitting at least a portion of the data record through the communication interface from the passive NFC tag to the NFC reader of the central processing unit.

14. The method of claim 13, further comprising controlling the operation of the electronic device with the central processing unit in accordance with the at least one operating parameter transmitted through the communication interface from the passive NFC tag to the NFC reader.

15. The method of claim 13, further comprising transmitting at least a portion of the data record through the communication interface from the NFC reader to the passive NFC tag for storage at an interval of operation or an event of operation.

16. The method of claim 13, further comprising mounting the passive NFC tag into an alignment feature to aid in aligning the NFC tag in proximity to the NFC reader of the central processing unit.

17. The method of claim 13, further comprising removing the central processing unit containing the NFC reader from the housing of the electronic device and installing a second central processing unit containing a second NFC reader within the housing of the electronic device within a proximity range of the passive NFC tag, wherein the second NFC reader and the passive NFC tag are operable to form a second communication interface when positioned within the proximity range.

18. The method of claim 16, further comprising transmitting at least a portion of the data record through the second communication interface from the passive NFC tag to the second NFC reader.

19. The method of claim 17, further comprising controlling the operation of the electronic device with the second central processing unit based upon the at least one operating parameter transmitted through the second communication interface from the passive NFC tag to the second NFC reader.

20. A method of configuring an electronic device using a near field communication (NFC) system, the method comprising:
installing a central processing unit into a housing of the electronic device, the central processing unit containing an NFC reader;
mounting a passive NFC tag to the electronic device housing in a location separate from the central processing unit, the NFC tag being located within a proximity range of the NFC reader, wherein the NFC reader and the passive NFC tag are operable to form a communication interface when positioned within the proximity range;
wherein the passive NFC tag contains a data record including at least one operating parameter of the electronic device stored upon a rewritable storage element;

transmitting an at least a portion of the data record through the communication interface from the passive NFC tag to the NFC reader of the central processing unit; and controlling an operation of the electronic device in accordance with the at least one operating parameter in said data record.

21. The method of claim 20, further comprising transmitting a data record containing at least one operating parameter to the passive NFC tag with an external NFC reader.

22. The method of claim 20, further comprising removing the central processing unit containing the NFC reader from the housing of the electronic device and installing a second central processing unit containing a second NFC reader within the housing of the electronic device within a proximity range of the passive NFC tag, wherein the second NFC reader and the passive NFC tag are operable to form a second communication interface when positioned within the proximity range.

23. The method of claim 22, further comprising transmitting at least a portion of the data record through the second communication interface from the passive NFC tag to the second NFC reader.

24. The method of claim 23, further comprising controlling the operation of the electronic device with the second central processing unit based upon the at least one operating parameter transmitted through the second communication interface from the passive NFC tag to the second NFC reader.

25. A near field communication (NFC) system for transmitting operation data to remote storage, the system comprising:

an LED luminaire device comprising a housing and an LED driver, the LED driver removably installed within the housing, the LED driver containing an NFC reader, the LED driver configured to control an operation of an LED luminaire and to read and write a data record, the data record including at least one operating parameter of the LED luminaire device;

a passive NFC tag comprising a rewritable storage element and an antenna, the passive NFC tag being mounted to the LED luminaire device housing in a location separate from the LED driver, said passive NFC tag being located within a proximity range of the NFC reader, wherein the NFC reader and passive NFC tag are operable to form a communication interface when positioned within the proximity range;

wherein the communication interface enables the NFC reader of the LED driver to transmit the data record to the passive NFC tag for storage, the NFC tag being configured to receive the data record and store said data record within the rewritable storage element; and wherein the communication interface further enables the passive NFC tag to transmit the data record to the NFC reader.

* * * * *